J. A. ERICKSON.
COMBINED HARROW AND SEED PLANTER.
APPLICATION FILED FEB. 16, 1911.
1,023,631.
Patented Apr. 16, 1912.
5 SHEETS—SHEET 1.
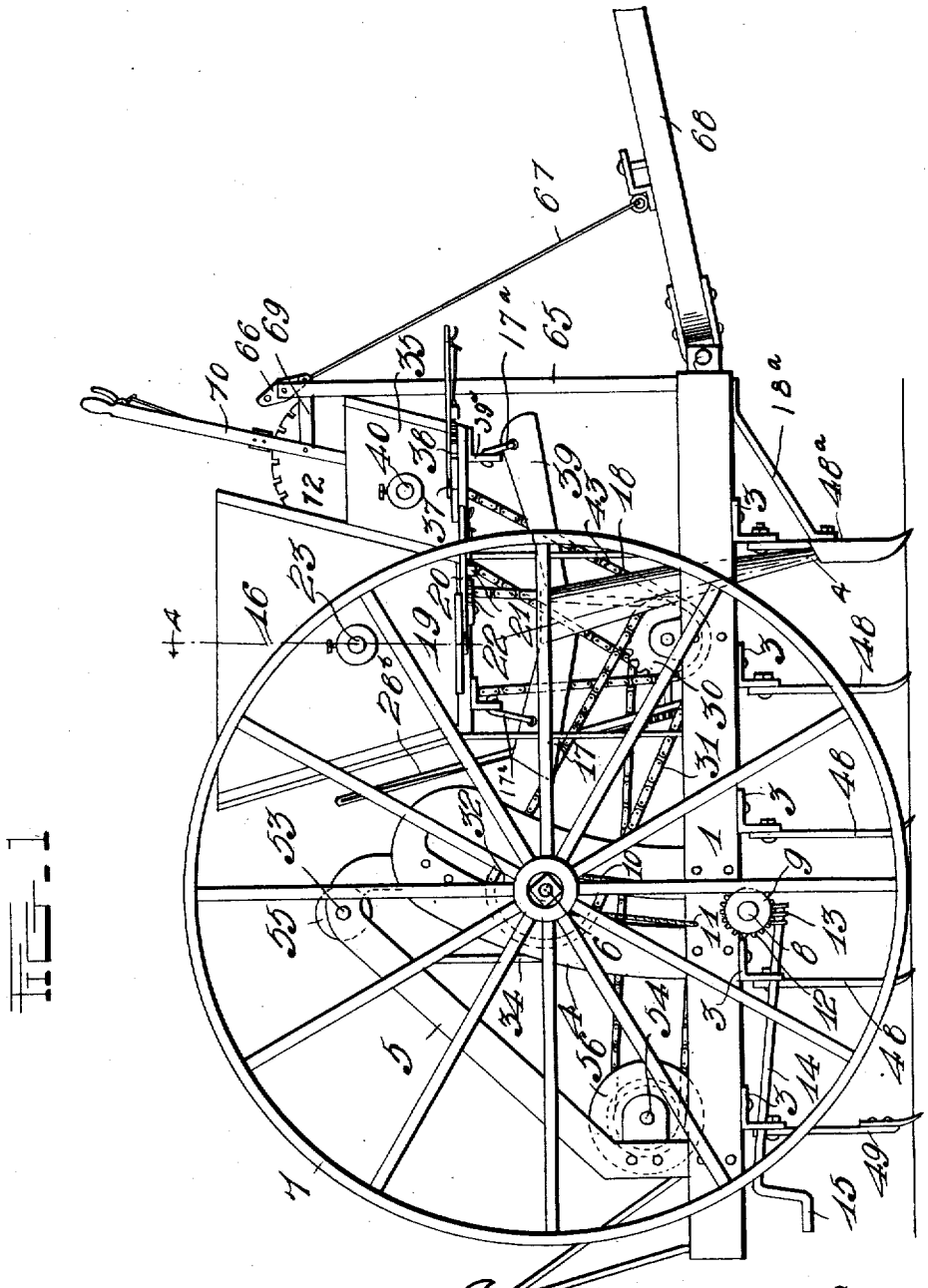
Witnesses
C. R. Hardy
O. B. Hopkins
Inventor
John A. Erickson
by H. B. Willson & Co.
Attorneys

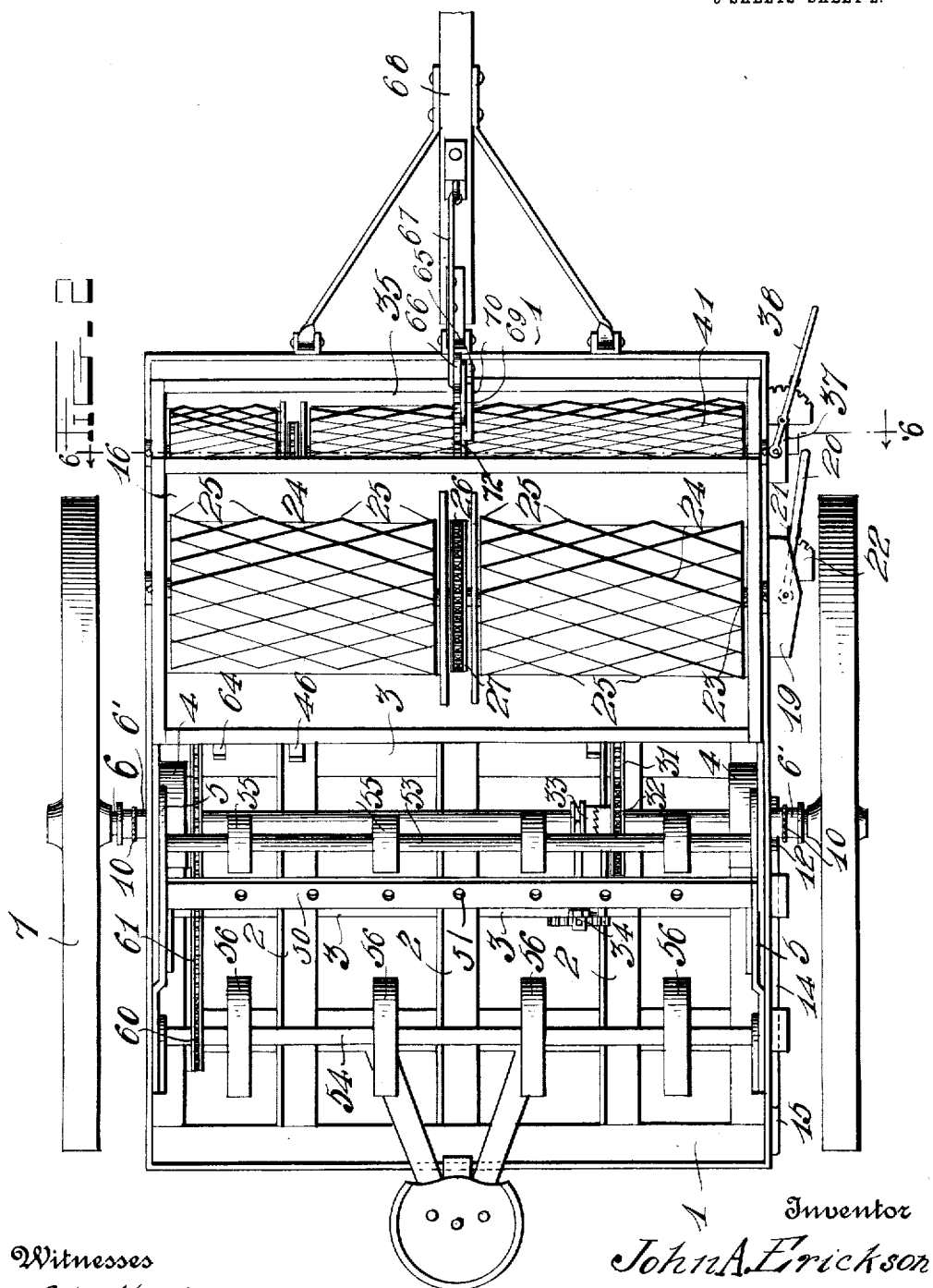

J. A. ERICKSON.
COMBINED HARROW AND SEED PLANTER.
APPLICATION FILED FEB. 16, 1911.
1,023,631.
Patented Apr. 16, 1912.
5 SHEETS—SHEET 3.
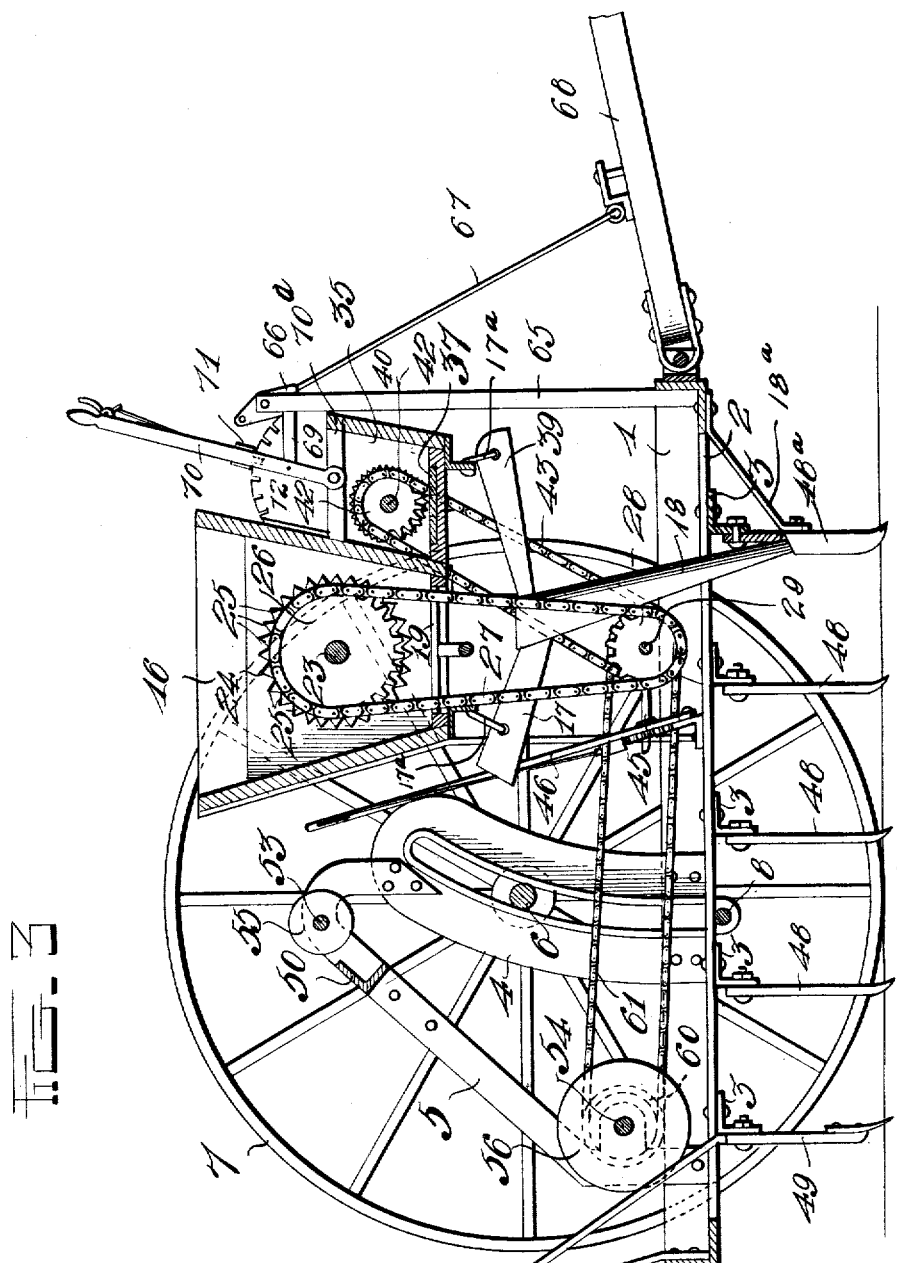
Witnesses
Inventor
John A. Erickson
by H. B. Willson & Co.
Attorneys

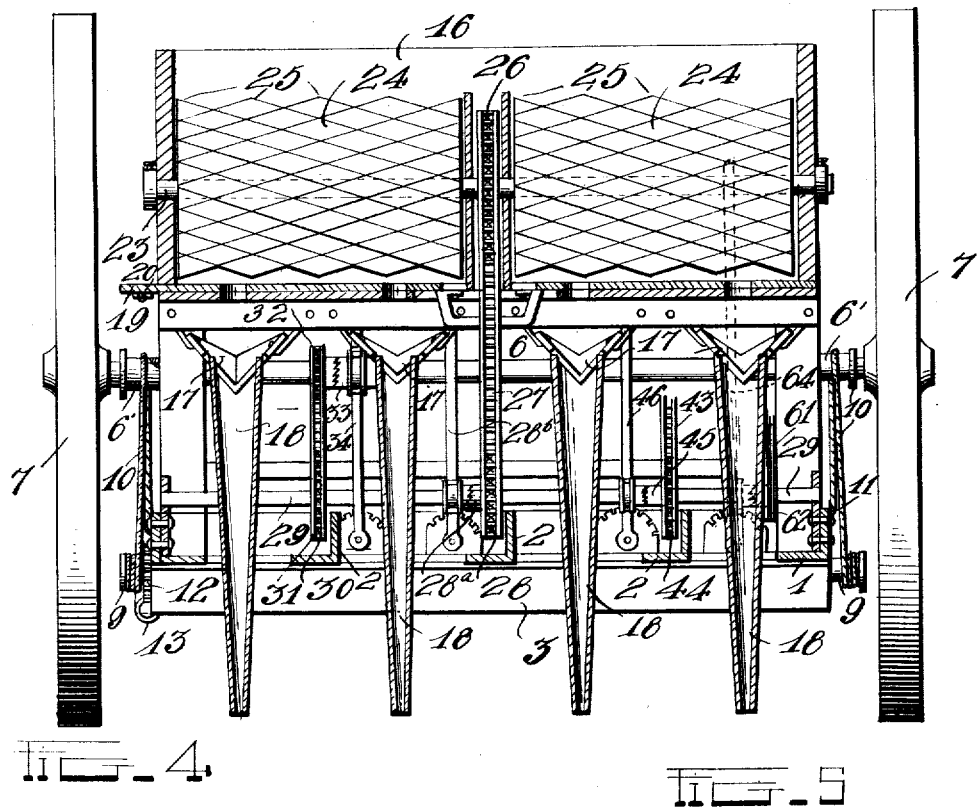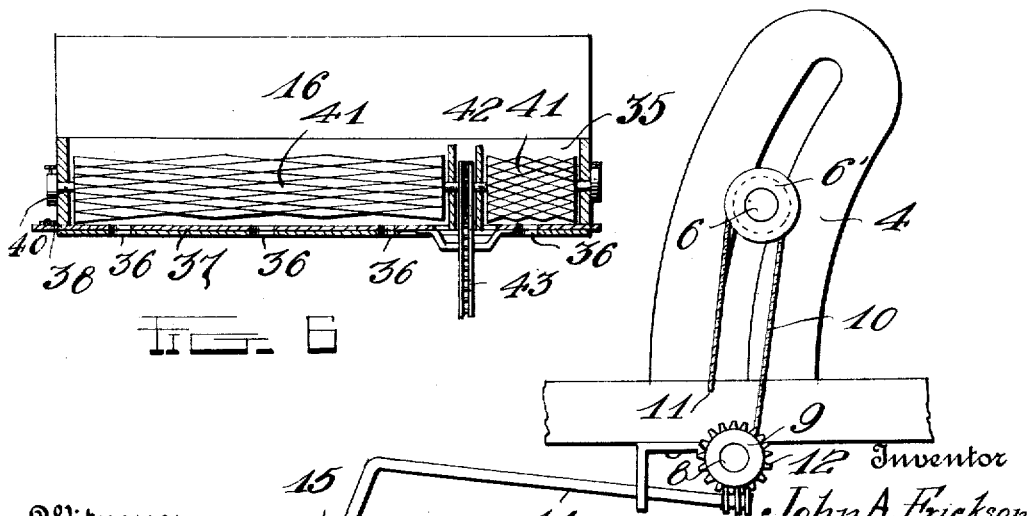

J. A. ERICKSON.
COMBINED HARROW AND SEED PLANTER.
APPLICATION FILED FEB. 16, 1911.
1,023,631.
Patented Apr. 16, 1912.
5 SHEETS—SHEET 5.
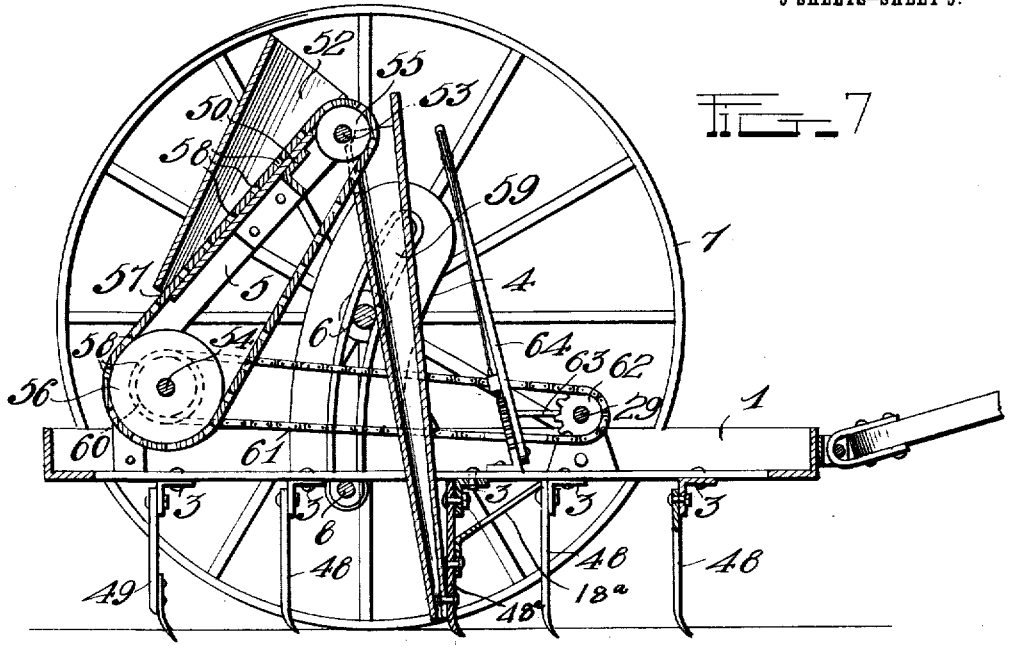
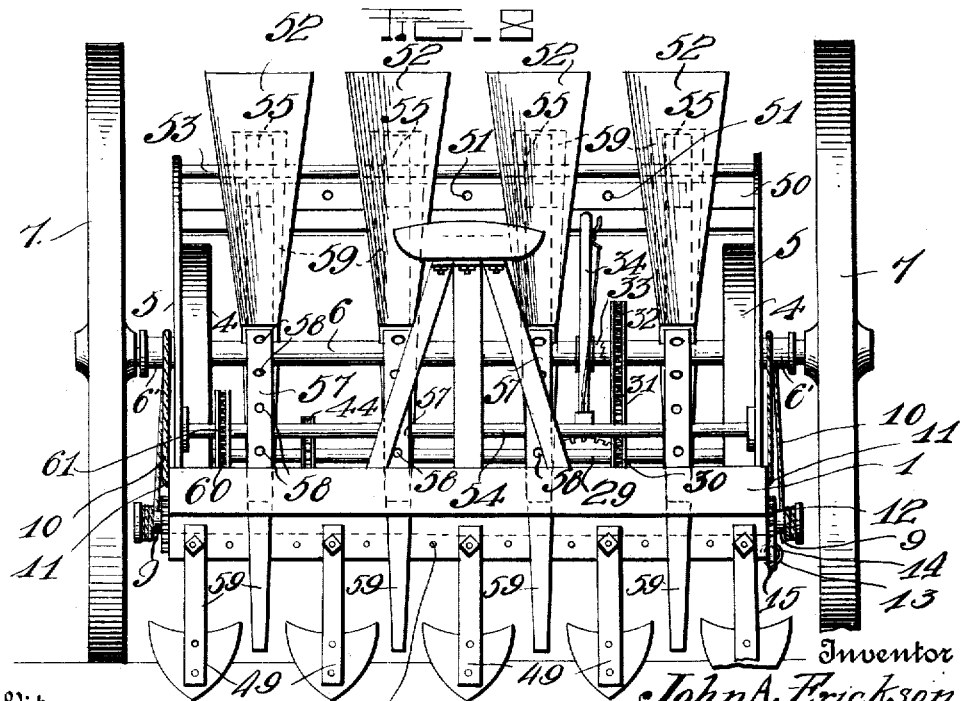
Witnesses
C. R. Hardy
O. B. Hopkins
Inventor
John A. Erickson
by H. B. Willson & Co.
Attorneys

UNITED STATES PATENT OFFICE.

JOHN A. ERICKSON, OF FAIRVIEW, UTAH.

COMBINED HARROW AND SEED-PLANTER.

1,023,631.  Specification of Letters Patent.  Patented Apr. 16, 1912.

Application filed February 16, 1911. Serial No. 608,881.

*To all whom it may concern:*

Be it known that I, JOHN A. ERICKSON, a citizen of the United States, residing at Fairview, in the county of Sanpete and State of Utah, have invented certain new and useful Improvements in Combined Harrows and Seed-Planters; and I do declare the following to be a full, clear, and exact description of the invention, such as will enable others skilled in the art to which it appertains to make and use the same.

This invention relates to improvements in combined harrows and seed planters.

One object of the invention is to provide a wheeled harrow having means thereon for interchangeably supporting seed hoppers and means for planting seeds of different kinds in drills or broadcast.

Another object is to provide a machine of this character having an improved means for adjustably supporting the harrow and planting mechanism thereof whereby the seeds may be planted to a greater or less depth as desired.

With these and other objects in view, the invention consists of certain novel features of construction, combination and arrangement of parts as will be more fully described and particularly pointed out in the appended claims.

In the accompanying drawings: Figure 1 is a side view of the machine showing a grain hopper arranged in operative position thereon and the parts arranged for sowing the seed in drills; Fig. 2 is a top plan view thereof; Fig. 3 is a central vertical longitudinal section of the same; Fig. 4 is a vertical cross sectional view through the grain hopper and the grain discharging and drilling mechanism on the line 4—4 of Fig. 1; Fig. 5 is an enlarged side view of a portion of the frame showing the axle in section and illustrating the means for raising and lowering the frame; Fig. 6 is a detail longitudinal sectional view through the grass seed hopper and feeding mechanism on the line 6—6 of Fig. 2; Fig. 7 is a central vertical longitudinal sectional view through the machine showing the grain hopper removed and beet seed planting devices arranged thereon; Fig. 8 is a rear view of the machine with the parts arranged as shown in Fig. 6.

In the embodiment of the invention I provide a main frame 1 which is of substantially rectangular form and is preferably constructed of angle iron side and end bars. The end bars of the frame are connected together by a series of longitudinally extending bars 2 while the side bars of the frame are connected together by a series of transversely disposed parallel tooth holding bars 3. The tooth bars 3 are preferably bolted to the lower sides of the longitudinal bars 2 and the side bars of the frame as shown. To the side bars of the frame and substantially midway between their ends are secured the lower ends of upwardly projecting segmental axle engaging guide frames 4 whose guide slots are struck on a curve around the drive shaft 29 described below. The frames 4 are rigidly braced by inclined brace bars 5 and are engaged with the supporting and driving axle or shaft 6 near its outer ends as shown. On the outer ends of the shaft 6 are loosely mounted supporting and operating wheels 7, said wheels having the usual pawl and ratchet connection with the axle 6 which is commonly employed in wheels of agricultural machines whereby when the wheels are turned in a forward direction the shaft or axle will be revolved thereby and when turned in a reverse direction said wheels will run idly on the shaft.

Revolubly mounted in suitable bearings in the projecting lower ends of the frames 4 is a main frame raising and lowering shaft 8 on the opposite outer ends of which are fixedly mounted cable winding drums 9 with which are connected and adapted to be wound one end of frame lifting cables 10 which pass upwardly and around sheaves 6' loosely mounted on the adjacent ends of the axle or shaft 6 and from thence extend downwardly and are secured at their opposite ends to the side bars of the frame as shown at 11. On one end of the shaft 8 is fixedly mounted a worm gear 12 with which is adapted to be engaged a worm 13 fixed on the inner end of a rearwardly projecting operating shaft 14 on the outer end of which is formed a crank handle 15 whereby said shaft and the worm gearing is revolved and the motion thereof imparted to the shaft 8 to turn the same and the drums 9 thereon in the proper direction for winding or unwinding the frame adjusting cables 10 whereby the frame 1 is raised and lowered within the guide frame 4 and supported at any desired elevation.

In the first figures of the drawings the machine is shown as being provided with a grain hopper 16 in the bottom of which is formed a series of grain discharging passages through which the grain from the hopper is discharged into longitudinally tapering troughs 17 and thereby conveyed to suitably mounted drill tubes 18 by means of which the seed is discharged into drills formed to receive the same. The tubes 18 are connected at their lower ends with certain of the harrow teeth 48ª as seen in Fig. 1, and are by preference braced beneath the framework as at 18ª.

The discharge openings in the hopper are regulated by a suitable valve plate 19 which is slidably mounted over the bottom of the hopper and is provided with feed openings which, when the valve plate is shifted, will register or coincide to a greater or less extent with the discharge passages in the bottom of the hopper thereby opening and closing said passages to a greater or less degree whereby more or less seed will be permitted to pass therethrough into the seed troughs and drill tubes 18. The valve plate 19 is operatively connected at one end with an adjusting lever 20 arranged on one end of the hopper and having a pawl 21 adapted to be engaged with a segmental rack 22 whereby the valve plate is held in its adjusted position. In the hopper 16 is revolubly mounted a feed shaft 23 on which is arranged any suitable form of seed feeding mechanism 24 whereby the seed will be discharged through the feed openings in the bottom of the hopper. The seed feeding mechanism 24 is here shown and preferably consists of two rollers which are checkered or have formed thereon pointed seed engaging projections 25 arranged as shown in the drawings whereby the seed is forced through the discharge passages as hereinbefore described.

The shaft 23 is provided with a sprocket gear 26 which is preferably mounted thereon between its rollers and is connected by a sprocket chain 27 to a sprocket gear 28 loosely mounted on a drive shaft 29 journaled in the frame of the machine below the grain hopper and forward of the guide frames 4 as shown. The sprocket gear 28 is provided with a suitable clutch mechanism 28ª having an operating lever 28ᵇ. Fixedly mounted on the shaft 29 is a sprocket gear 30 which is connected by a sprocket chain 31 to a sprocket gear 32 loose on the axle 6 of the machine. The sprocket gear 32 is operatively connected to the axle 6 by a suitable clutch mechanism 33 having an operating lever 34 which projects up to within convenient reach of the driver's seat whereby the clutch may be shifted to throw the drive shaft 29 and all the working parts into and out of gear.

Arranged on the front side of the grain hopper and preferably forming a part of the same is a grass seed hopper 35 having in its lower side a series of seed discharge passages 36 the size of which is regulated by a valve plate 37 constructed and arranged in the same manner as the valve plate 19 of the grain hopper, the feed openings in said grass seed hopper and valve plate being of considerably smaller size than the feed openings in the grain hopper and valve plate. The valve plate 37 of the grass seed hopper is provided with an adjusting lever 38 constructed and arranged in the same manner as the adjusting lever of the grain valve plate. Below the discharge openings in the grass seed hopper are arranged a series of troughs 39 whose bodies taper toward their lower ends which communicate with the upper ends of the grain drilling tubes 18 whereby the grass seed is discharged into said drill tubes and is planted thereby in the same manner as the grain. Revolubly mounted in the grass seed hopper is a feed shaft 40 having arranged thereon seed feeding rollers 41 similar to the rollers 24 on the grain feeding shaft 23 except that the feed rollers 41 are of a much smaller size than the rollers 24. The feed shaft 40 has fixedly mounted thereon at a suitable position in the hopper 35 a sprocket gear 42 which is connected by a sprocket chain 43 with a similar gear 44 loosely mounted on the drive shaft 29 and which is adapted to be operatively connected to said shaft by a suitable clutch mechanism 45 provided with a shifting lever 46 which extends upwardly to within convenient reach of the operator. By removing the drill tubes 18 and reversing the position of the grain feeding troughs 17 or the grass seed feeding troughs 39, grain or grass seed fed into the troughs from their respective hoppers may be sown broadcast as the seed falling from the wider ends of the troughs will be scattered over the ground. For this purpose both sets of troughs are supported removably beneath their hoppers by hooks 17ª engaging eyes 39ª best seen in Fig. 1.

The tooth holding bars 3 of the main frame and the rear cross bar thereof are provided with a series of bolt holes 47 by means of which the harrow teeth 48 and cultivator teeth 49 may be adjustably and interchangeably secured to said bars whereby the ground is worked and marked simultaneously with the planting of the seeds thereby greatly expediting the planting operation. By providing the frame with the tooth bars 3 and the harrow and cultivator teeth it is obvious that the seed planting mechanism may be thrown out of gear or entirely removed and the machine employed as a harrow or cultivator or for the purpose of forming drain ditches or similar operations.

In addition to the grain and grass seed planting mechanism hereinbefore described the machine may also be employed for planting beet or similar seeds, and with this end in view the machine is provided with a hopper supporting bar 50 the opposite ends of which are preferably secured to the rear braces 5 of the guide frames 4 as shown. The bar 50 is provided with a series of bolt holes 51 whereby the seed hoppers 52 carrying the beet or other form of seed may be removably and adjustably secured to the bar and spaced at any suitable distances apart. Any desired number of seed hoppers 52 may be employed and secured in this manner to the hopper supporting bar 50. Revolubly mounted in the upper portion of the brace bars 5 adjacent to and in front of the upper ends of the hoppers 52 is an upper feed belt supporting shaft 53. Revolubly mounted in suitable bearings on the lower portion of the brace bars 5 is a lower feed belt supporting and driving shaft 54. On the shafts 53 and 54 are mounted pulleys 55 and 56 the pulleys 55 on the upper shaft 53 being of less diameter than the pulleys 56 on the lower shaft. Arranged on the pulleys 55 and 56 and operated thereby are endless seed feeding belts 57 having formed therein at suitable intervals seed pockets 58 in which the seed drops as the belts pass through the hoppers and by means of which the seed is elevated and delivered into discharge or drill tubes 59 which are hung at their upper larger ends to the shaft 53 and are secured at their lower smaller ends to certain harrow teeth 48ª as seen in Fig. 7, and braced as at 18ª. The seeds when thus elevated from the hoppers and delivered into the discharge tubes are deposited by the latter in rows at the desired distances apart. It will be understood that upper and lower pulleys 55 and 56 are provided for each hopper 52 and said pulleys are fixedly mounted on the shafts 53 and 54 in any suitable manner.

On the shaft 54 is fixedly mounted a sprocket gear 60 which is connected by a sprocket chain 61 to a sprocket gear 62 loosely mounted on the drive shaft 29 whereby the motion of said shaft is imparted to the shaft 54 to drive the seed feeding belts in the manner described. The gear 62 is provided with a suitable clutch mechanism 63 having a shifting lever 64 which extends up within convenient reach of the operator whereby the driving mechanism for the seed feeding belts may be thrown into and out of gear.

In the front portion of the machine is arranged a tilting mechanism comprising a vertically disposed standard 65 which is suitably braced and secured at its lower end to the front cross bar of the main frame and projects upwardly a sufficient distance to bring the upper end thereof near the upper portion of the machine as shown. On the upper end of the standard 65 is pivotally mounted a short tilting bar 66 the forward end of which is connected by a connecting rod 67 with the tongue 68 of the machine. The rear end of the tilting bar 66 is connected by a link 69 to the lower end of a tilting lever 70ª which is pivotally mounted on a supporting bracket 70 secured to the cross bar of the frame as shown. The lever is provided with a suitable pawl 71 which engages a segmental rack 72 whereby the lever is held in its adjusted position. By means of the lever and its connections with the tongue 68 of the machine the latter may be tilted forwardly or rearwardly to throw the harrow or cultivator teeth into the ground to a greater or less extent as will be readily understood.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. In a combined harrow and seed planter, the combination with the main frame, a driving axle mounted on wheels, and mechanism for adjusting the height of the frame with respect to said axle; of a series of tooth-holding bars in said frame, harrow and cultivator teeth removably and adjustably carried by said bars, a seed planting mechanism mounted on the frame, feeding mechanism therein driven by the rotation of said axle, tapering troughs, hook-and-eye connections between them and the hopper of said planting mechanism whereby the troughs are rendered reversible end for end, tubes for conducting the seed from the smaller ends of said troughs to points in rear of certain of said harrow teeth, and means for detachably connecting the latter with the lower ends of said tubes.

2. In a combined harrow and seed planter, the combination with the main frame carrying the harrow teeth, a driving shaft journaled across the frame, guide frames rising from the main frame and having slots struck on a curve around said shaft, a wheeled axle extending through said slots, a sprocket-and-chain connection between said axle and driving shaft, and means for adjusting the height of the axle within said slots; of seed planting mechanism mounted on said frame and consisting of a hopper, tubes delivering the material from said hopper and connected at their lower ends with certain of said teeth, seed feeding mechanism within said hopper, and a sprocket-and-chain connection between this mechanism and said driving shaft.

In testimony whereof I have hereunto set my hand in presence of two subscribing witnesses.

JOHN A. ERICKSON.

Witnesses:
A. P. ANDERSON,
BYRAN MAUER.